United States Patent

Marsanne et al.

[11] Patent Number: 6,052,153
[45] Date of Patent: Apr. 18, 2000

[54] SYNCHRONIZATION CIRCUIT AND METHODS FOR SCREENS WITH SCANNING CIRCUITS THAT REDUCE THE EFFECTS OF VARIATIONS IN FREQUENCY OF AN INPUT SIGNAL

[75] Inventors: Sébastien Marsanne, Grenoble; Philippe Berger, Crolles; Vincent Chanel, Grenoble, all of France

[73] Assignee: SGS-Thomson Microelectronics S.A., Saint Genis, France

[21] Appl. No.: 08/734,524

[22] Filed: Oct. 18, 1996

[30] Foreign Application Priority Data

Oct. 20, 1995 [FR] France ................................. 95 12611

[51] Int. Cl.⁷ ................................. H04N 5/46; H03L 7/00
[52] U.S. Cl. ........................... 348/542; 348/547; 348/555
[58] Field of Search .................................... 348/540, 542, 348/500, 501, 543, 544, 531, 533, 558, 537, 555, 545, 547; H04N 5/04

[56] References Cited

U.S. PATENT DOCUMENTS

| 5,019,907 | 5/1991 | Murakoshi et al. | 358/158 |
|---|---|---|---|
| 5,126,639 | 6/1992 | Srivastava | 348/555 |
| 5,258,841 | 11/1993 | Okada et al. | 358/153 |
| 5,339,111 | 8/1994 | Park | 348/524 |

FOREIGN PATENT DOCUMENTS

| 63-002468 | 1/1988 | Japan | H04N 5/08 |
|---|---|---|---|
| 2135995 | 5/1990 | Japan | H04N 9/47 |
| 2 094 083 | 9/1982 | United Kingdom | H03K 5/19 |

OTHER PUBLICATIONS

*French Preliminary Search Report*, issued for FR 95/12611, filed Oct. 20, 1995.

*Primary Examiner*—Victor R. Kostak
*Attorney, Agent, or Firm*—Wolf, Greenfield & Sacks, P.C.

[57] ABSTRACT

Disclosed is a synchronization circuit that can be applied in the field of monitors and, especially, in the field of television receivers. The disclosed circuit comprises circuits to analyse and correct the horizontal and vertical synchronization signals in order to neutralize the effect of the signalling present in the horizontal synchronization signal on the working of a phase-locked loop.

36 Claims, 8 Drawing Sheets

FIG_1

FIG_6

FIG_2

FIG_3a

FIG_3b

FIG_4a

FIG_4b

FIG. 5a

FIG_5b

SYNCHRONIZATION CIRCUIT AND METHODS FOR SCREENS WITH SCANNING CIRCUITS THAT REDUCE THE EFFECTS OF VARIATIONS IN FREQUENCY OF AN INPUT SIGNAL

BACKGROUND OF THE INVENTION

1. Field of the Invention

The present invention relates to a synchronization circuit. It may be applied in the field of monitors, and more particularly in the field of television receivers.

A synchronization circuit may be used to set the rate at which an electron beam scans a screen. Synchronization signals in this context contain a timing information element used to set the start of a line and the start of a frame. A frame may contain all of the lines needed to form an image on the screen of a monitor.

Horizontal synchronization signals as well as vertical synchronization signals, also called line synchronization signals and frame synchronization signals respectively, are used for the production, by means of a phase-locked loop, of the scanning signals needed for the scanning of the screen by an electron beam.

The invention shall be described in the context of the processing of television signals without thereby in any way limiting the scope of the invention.

2. Discussion of the Related Art

Figure 1:
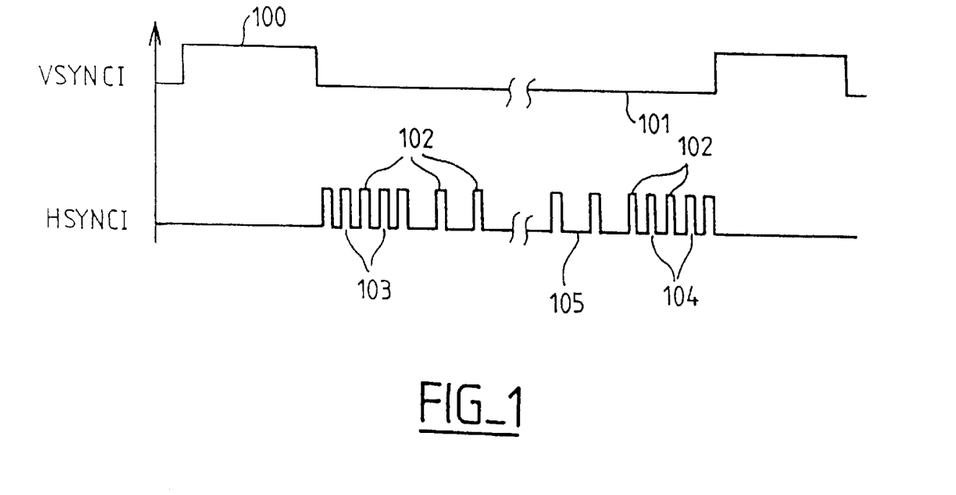
FIG. 1 shows a timing diagram of horizontal and vertical synchronization signals.

In a television receiver, the synchronization signals are extracted from a video signal and given to a phase-locked loop. FIG. 1 shows a vertical synchronization signal VSYNCI and a horizontal synchronization signal HSYNCI, both extracted from a video signal. The vertical synchronization signal VSYNCI is a half-wave periodic rectangular-pulse signal with a high level 100, referred to as a frame flyback pulse, and a low level 101. During the frame flyback pulse 100 of the vertical synchronization signal VSYNCI, the working of the phase-locked loop, which is connected to the output of the synchronization circuits, is inhibited.

The horizontal synchronization signal HSYNCI is a sequence of line synchronization pulses 102 identically spaced out in time, each pulse corresponding to the synchronization of a line. This signal also has start-of-frame signal pulses 103 and end-of-frame signal pulses 104, respectively called post-equalization and pre-equalization pulses. The end-of-frame signal pulses 104 announce the frame flyback pulse. As for the start-of-frame signal pulses 103, they represent the display standard used.

The number of lines displayed on the screen differs according to the resolution used, as well as the display standards used in different regions of the world. Whereas current images have 525 lines or 625 lines, new standards specify 1024 lines. In addition, the frequency of refreshing the images on the screen, which may be about 25 images per second, also depends on the standard used.

The start-of-frame and end-of-frame signal pulses are positioned between line synchronization pulses. As a result, the frequency of the pulses of the horizontal synchronization signal at the start and at the end of a frame is twice as great as it is during the rest of the frame. The shape of the synchronization signals may then raise a problem.

The resulting changes of frequency due to the above signals interferes with the functioning of the phase-locked loop, which is connected to the synchronization signals after the synchronization circuit. The phase-locked loop may then go out of its range of operation.

The large number of standards and their varied nature dictate the use of systems that enable the processing of all types of synchronization signals. These systems should be capable of analyzing the synchronization signals whatever the display standard used, and of modifying them so as to improve the working of the phase-locked loops. Furthermore, these systems may include circuits designed to generate synchronization signals.

According to an embodiment of the invention, therefore, there is proposed a circuit capable of carrying out the following functions: receiving horizontal and vertical synchronization signals of any kind, measuring their period or acquiring information elements that represent the shape of these signals and producing a horizontal synchronization signal devoid of end-of-frame signal pulses 104 and a vertical synchronization signal whose frame flyback pulse 100 is extended during the start-of-frame signal pulses 103. This being achieved, the working of the phase-locked loop is suspended during the start-of-frame signalling pulses 103 and it no longer receives the end-of-frame signal pulses 104.

One aim of the invention is to create a synchronization circuit that may be integrated into all types of monitors.

SUMMARY OF THE INVENTION

According to one embodiment of the invention, a synchronization circuit for screens with scanning circuits is provided. The circuit includes a horizontal synchronization generation circuit to produce a first horizontal synchronization output signal, a horizontal synchronization analysis circuit, and a horizontal sychronization correction circuit to produce a second horizontal synchronization output signal and a signal pulse detection output signal.

According to another embodiment of the invention, a method of operating a phase-locked loop in a scanning circuit for a screen is provided. According to the method, a first synchronization signal is provided to the phase-locked loop. Interference with the operation of the phase-locked loop caused by changes of frequency in the first synchronization signal is limited, thereby maintaining operation of the phase-locked loop within a normal range of operation for the phase-locked loop. In one embodiment, this is achieved by removing frame signal pulses from the first synchronization signal. In another embodiment, operation of the phase-locked loop is inhibited when frame signals are present.

According to another embodiment of the invention, a method of processing synchronization signals used with a screen having a scanning circuit is provided. According to the method, a characteristic of the first synchronization signal is measured, and the first synchronization signal is provided to the scanning circuit.

According to another embodiment of the invention, a synchronization circuit for use with a screen having a scanning circuit that includes a phase-locked loop is provided. The circuit includes a terminal to receive the first synchronization signal and means for limiting interference with the operation of the phase-locked loop, caused by changes in the frequency of the first synchronization signal when frame signal pulses occur.

According to another embodiment of the invention, a method of operating a circuit in a first mode and a second mode, the circuit including an edge detector, a counter, and a first input terminal to receive a first synchronization signal, is provided. According to the method, a first plurality of connections among the components is arranged to measure a characteristic of a first synchronization signal during the first mode of operation. During the second mode of operation, the plurality of connections is rearranged to produce a modified first synchronization signal.

BRIEF DESCRIPTION OF THE DRAWINGS

The particular features of the invention shall appear more clearly from the following description made with reference to the appended figures, of which.

DETAILED DESCRIPTION

FIG. 1a, which shows a horizontal synchronization signal HSYNCI and a vertical synchronization signal VSYNCI, has been described above.

Figure 2:
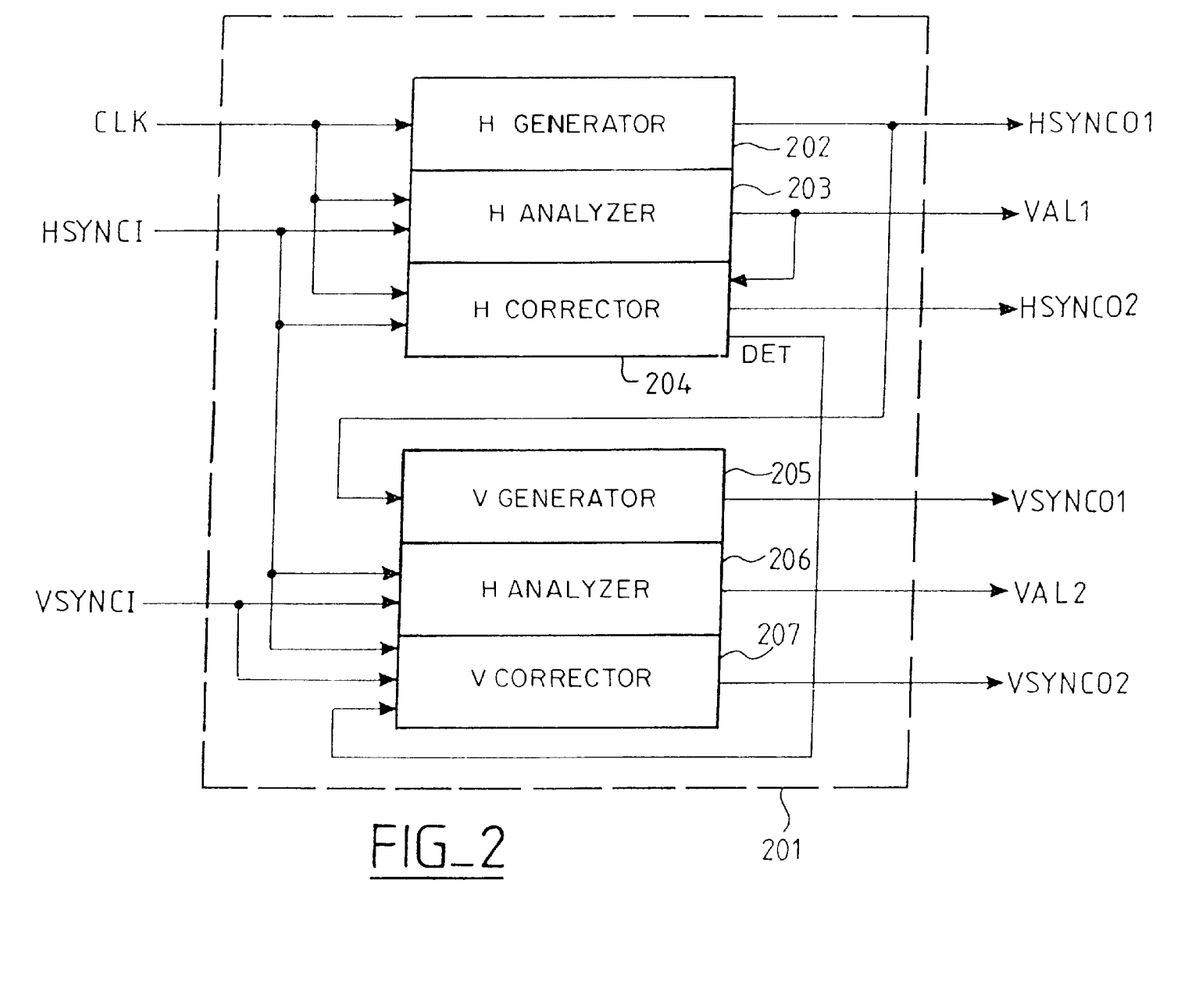
FIG. 2 shows a block-level diagram of one embodiment of a synchronization circuit according to the invention.

FIG. 2 shows a block-level diagram of a synchronization circuit according to the invention. The synchronization circuit 201 enables the processing both of the horizontal synchronization signal and of a vertical synchronization signal. The synchronization circuit 201 comprises:

- a horizontal synchronization generation circuit 202 receiving a clock signal CLK and delivering a first horizontal synchronization output signal HSYNCO1,
- a horizontal synchronization analysis circuit 203 receiving, at input, the horizontal synchronization input signal HSYNCI and the clock signal CLK and producing a value VAL1 representing the time interval between two line synchronization pulses of the horizontal synchronization input signal HSYNCI,
- a horizontal synchronization correction circuit 204 delivering a second horizontal synchronization output signal HSYNCO2 and a signalling pulse detection signal DET from said horizontal synchronization input signal HSYNCI, the clock signal CLK and the value VAL1 representing the time interval between two line synchronization pulses of the horizontal synchronization input signal,
- a vertical synchronization generation circuit 205 to produce a first vertical synchronization output signal VSYNCO1 from the first horizontal synchronization output signal HSYNCO1,
- a vertical synchronization analysis circuit 206 receiving, at input, the vertical synchronization input signal VSYNCI and the horizontal synchronization input signal HSYNCI and producing a value VAL2 representing the number of lines between two frame flyback pulses of the vertical synchronization input signal, and
- a vertical synchronization correction circuit 207 delivering a second vertical synchronization output signal VSYNCO2 from said vertical synchronization input signal VSYNCI, the horizontal synchronization input signal HSYNCI and the signal detection pulse signal DET.

An embodiment of different elements of synchronization circuit 201 is shown in FIGS. 3a to 5b.

The synchronization circuit 201 comprises a horizontal synchronization generator 202 and a vertical synchronization generator 205 which, when there is no synchronization information in the signals to be processed by the monitor, gives a horizontal synchronization signal HSYNCO1 and a vertical synchronization signal VSYNCO1.

Figure 3A:
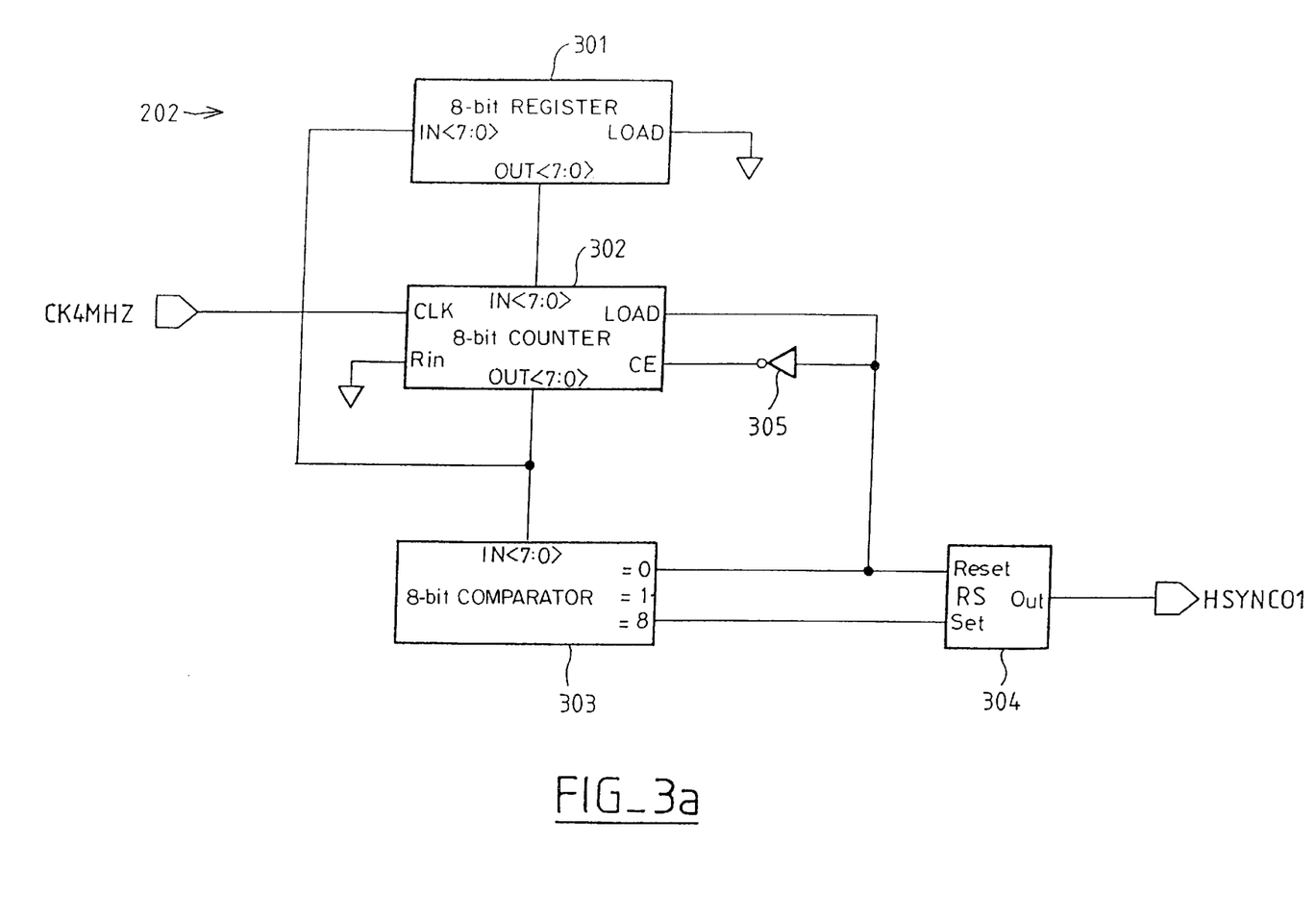
FIG. 3a shows one embodiment of the horizontal synchronization generation circuit according to the invention.

The horizontal synchronization generation circuit 202 shown in FIG. 3a has an eight-bit register 301, an eight-bit counter 302, an eight-bit comparator 303, an RS flip-flop circuit 304 and an inverter gate 305. The load input LOAD of the register 301 is connected to the ground. The output OUT<7:0> of the register 301 is connected to the input IN<7:0> of the counter 302 and vice versa.

Furthermore, the output OUT<7:0> of the counter 302 is connected to the input IN<7:0> of the comparator 303. The input Rin of the counter 302 is connected to the ground. As for the comparator 303, it has a first output=8 and a second output=0. These outputs, namely=8 and=0, are connected respectively to the input Set and to the input Reset of the RS flip-flop circuit 304. The output=0, for its part, is also connected to the input LOAD of the counter 302 and, by means of an inverter gate 305, to the enable input CE of the counter 302. Finally, the input CLK of the counter 302 receives the clock signal CK4MHZ with a frequency of 4 MHz and the output Out of the RS flip-flop circuit 304 delivers a horizontal synchronization output signal HSYNCO1.

The embodiment of the horizontal synchronization generation circuit 202 shown in FIG. 3a works as follows: a value representing the period of the horizontal synchronization signal that will be produced is stored first of all in the register 301. As soon as the counter 302 is loaded with the value of the register 301, the counter 302 starts counting down from this value, at the rate of the clock signal CK4MHZ. When the state of the counter 302 is equal to 8, the flip-flop circuit 304 changes its state and the output signal HSYNCO1 goes to 1. The signal HSYNCO1 goes back to 0 when the counter 302 reaches the value 0. The counter 302 is then deactivated. It then gets loaded again with the value contained in the register 301 and starts counting down.

In the embodiment chosen in FIG. 3a, the duration of the high level of the horizontal synchronization output signal HSYNCO1 is equal to two microseconds. By contrast, its period is a function of the value contained in the register 301.

Figure 3B:
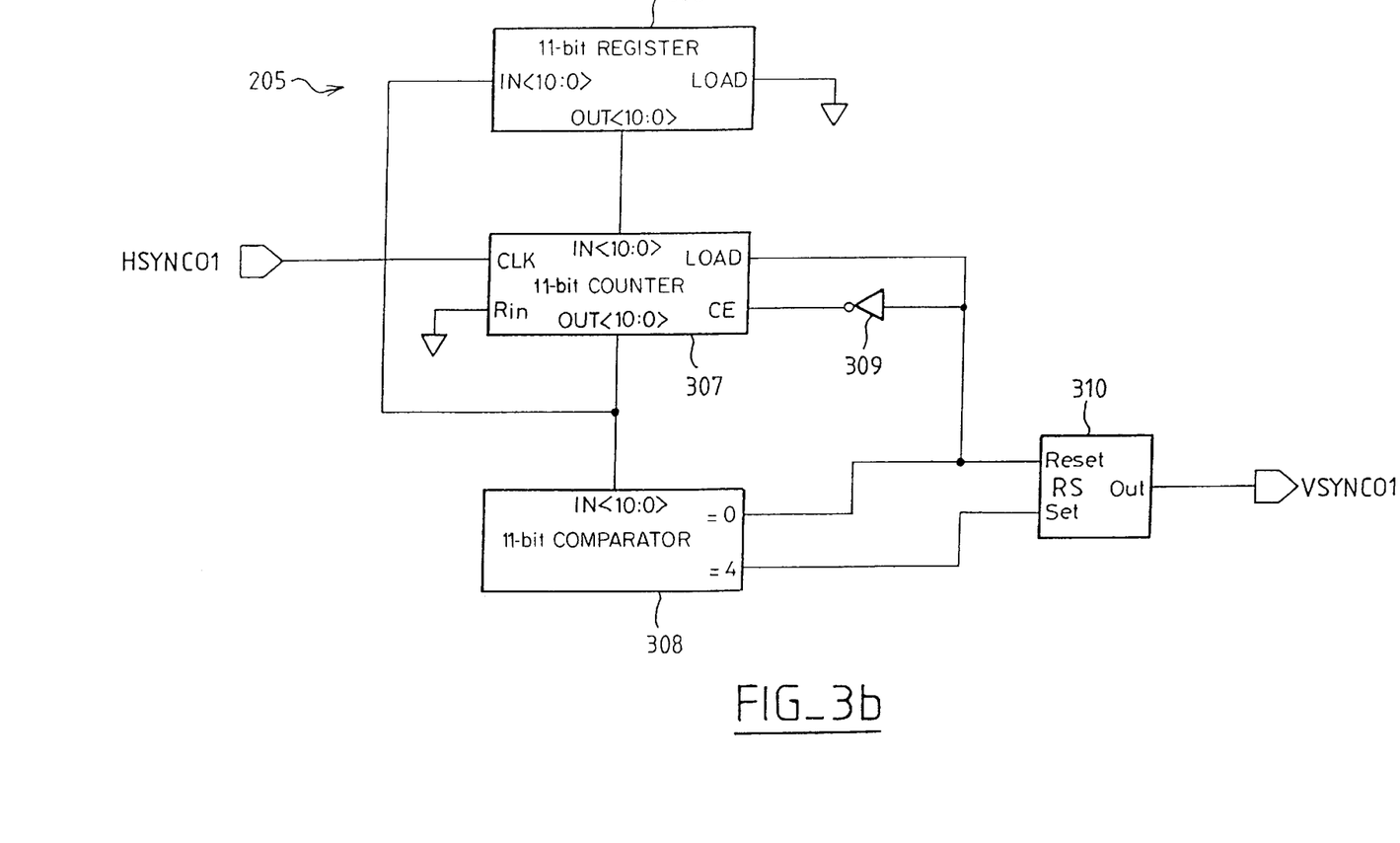
FIG. 3b shows one embodiment of the vertical synchronization generation circuit according to the invention.

The synchronization circuit 201 also has a vertical synchronization generation circuit 205 shown in FIG. 3b. The electronic diagram of this circuit 205 is described with reference to FIG. 3b. It is identical to the one proposed in FIG. 3a except that the eight-bit register, the eight-bit counter and the eight-bit comparator are replaced by an eleven-bit register 306, an eleven-bit counter 307 and an eleven-bit comparator 308 and that the references of the elements have changed. The eleven-bit comparator has an output=4 which delivers a high level when the state of the counter 307 is equal to 4. The diagram also shows an RS flip-flop circuit 310 that is identical to the RS flip-flop circuit 304.

To count the number of lines, the counter 307 counts down at the rate of the horizontal synchronization signal HSYNCO1. The output Out of the RS flip-flop circuit 310 then delivers a vertical synchronization signal VSYNCO1.

Regarding the operation of this circuit, the signal VSYNCO1 goes to 1 when the state present at the output OUT<10:0> of the counter 307 is equal to 4, and it goes back to 0 when this same state reaches the number 0.

In this example, therefore, the circuit produces a vertical synchronization signal VSYNCO1 with a frame flyback pulse whose duration is equivalent to four lines.

These two circuits, 202 and 205, therefore, enable the production, when there is no input synchronization, of synchronization signals devoid of start-of-frame and end-of-frame signal pulses.

According to an embodiment of the invention, the synchronization circuit 201 also enables the analysis of the horizontal synchronization signals as well as of the vertical synchronization signals present at the input of the circuit. It is thus possible to obtain information about the shape of these synchronization signals.

In this respect, the synchronization circuit 201 has a horizontal synchronization analysis circuit 203 and a vertical synchronization analysis circuit 206.

These analysis circuits may be activated at each change of a standard. The information obtained by these circuits may have a wide variety of uses. In the present example, the information acquired by the analysis circuit 203 is exploited by the correction circuit 204. In addition, knowing the number of lines per frame may, for example, be used by a device for displaying messages on the screen to center a text in the middle of the screen.

Figure 4A:
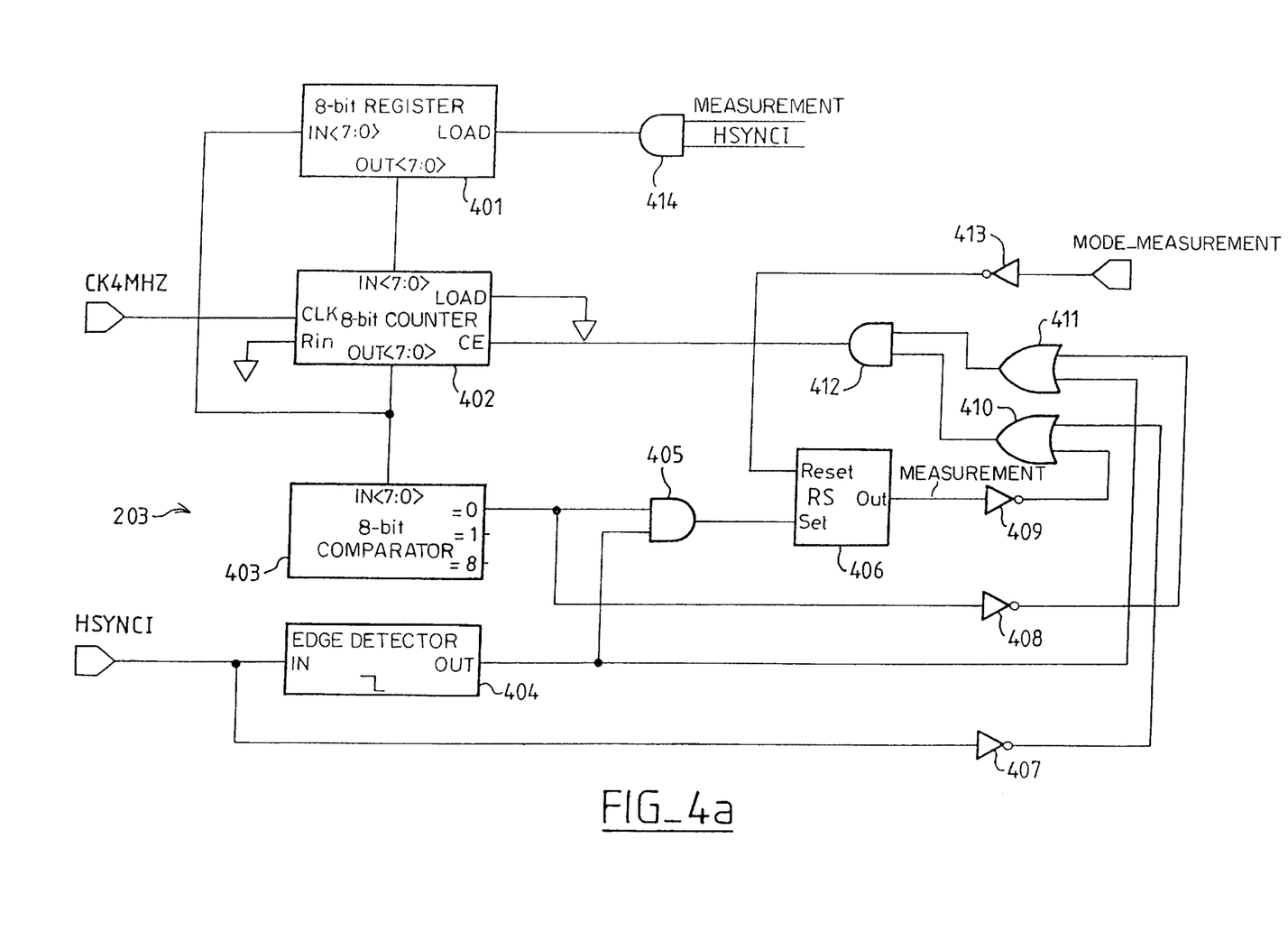
FIG. 4a shows one embodiment of the horizontal synchronization analysis circuit according to the invention.

FIG. 4a illustrates one implementation of the horizontal synchronization analysis circuit 203. This circuit enables the measurement of the time interval between two line synchronization pulses of an incoming horizontal synchronization signal, HSYNCI, and the storing of a value, VAL1, representing this interval in a register. Thereafter, the value of VAL1 will be used by the horizontal synchronization correction circuit 204. The circuit 203 is activated during a portion of the horizontal synchronization signal that contains no start-of-frame or end-of-frame signal pulses.

The circuit 203 has an eight-bit register 401, an eight-bit counter 402, an eight-bit comparator 403 and an RS flip-flop circuit 406. In practice, these elements, although they are referenced differently, may be the same as those used in FIG. 3a. A microprocessor (not shown) then makes it possible to organize the connections among these different elements according to the use desired.

The register 401, the counter 402 and the comparator 403 are connected to one another in the same way as the register 301, the counter 302 and the comparator 303 of the circuit 202 illustrated in FIG. 3a. Nevertheless, the inputs LOAD and Rin of the counter 402 are connected to the ground, the output=8 of the comparator 403 is not used and its output=0 is connected to a first input of an AND gate 405 and by means of an inverter gate 408, to a first input of an OR gate 411.

Furthermore, the horizontal synchronization signal HSYNCI to be analyzed enters the input IN of a trailing edge detector 404 and a first input of an OR gate 410. The output Out of the detector 404 is connected to a second input of the AND gate 405 and to a second input of the OR gate 411. The output of the AND gate 405 is connected to the input of an RS flip-flop circuit 406.

The RS flip-flop circuit 406 delivers a signal called a measurement signal. This signal goes to a high level after the trailing edge of a line synchronization pulse of the signal HSYNCI. The time interval between two line synchronization pulses is measured when this signal is at a high level.

In addition, the input Reset of the RS flip-flop circuit 406 receives a signal MODE_MEASUREMENT for the activation of the circuit 203 by means of an inverter gate 413. The output Out of this flip-flop circuit is connected by means of an inverter gate 409 to a second input of the OR gate 410. The outputs of the OR gates 410 and 411 are each connected to an input of an AND gate 412 whose output is connected to the enable input CE of the counter 402. Furthermore, an AND gate 414 receives the horizontal synchronization signal to be analyzed HSYNCI at a first input and the measured signal delivered by the flip-flop circuit 406 at a second input. Finally, the output of the AND gate 414 is connected to the input LOAD of the register 401.

The working of the embodiment of the analysis circuit 203 shown in FIG. 4a is as follows: a MODE_MEASUREMENT signal triggers the start of the analysis of the incoming horizontal synchronization signal HSYNCI. If the counter 402 is at 0 and if the signal HSYNCI has a trailing edge, the counter 402 starts counting at the rate of the clock signal CK4MHZ. As soon as the signal HSYNCI goes back to 1, the counter 402 goes off and the value present at the output OUT<7:0> of the counter 402 is loaded into the register 401. This value VAL1 corresponds to the number of pulses of the clock signal CK4MHZ between two line synchronization pulses.

Figure 4B:
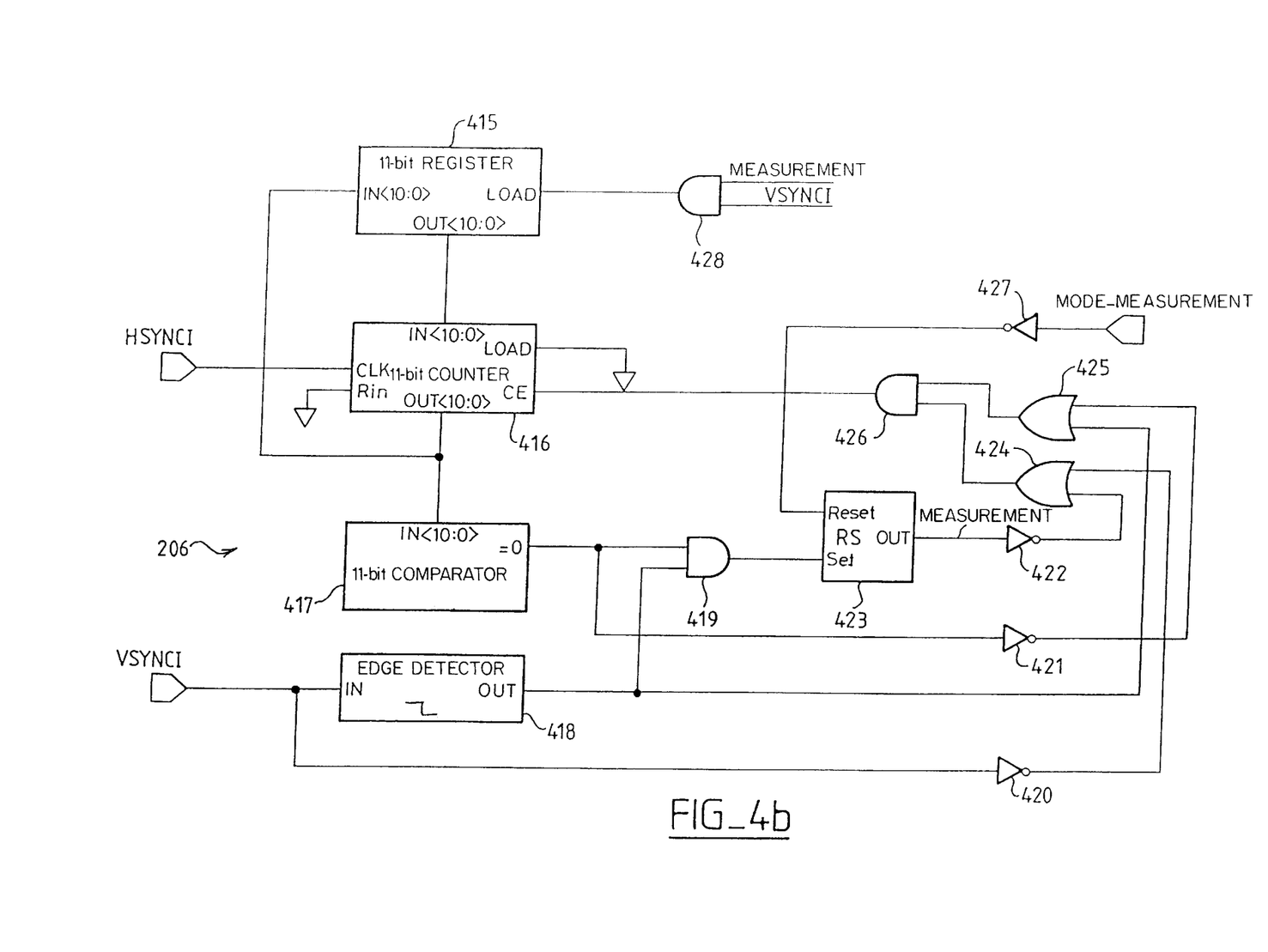
FIG. 4b shows one embodiment of the vertical synchronization analysis circuit according to the invention.

The synchronization circuit 201 also has a vertical synchronization analysis circuit 206, an illustrative embodiment of which is shown in FIG. 4b. A circuit of this kind enables the measurement of the number of lines between two frame flyback pulses of the vertical synchronization signals VSYNCI. In fact, this circuit counts the number of line synchronization pulses of the signal HSYNCI between two frame flyback pulses of the signal VSYNCI. The electronic diagram of this circuit is described with reference to the diagram of FIG. 4b.

Just as in the case of FIGS. 3a and 3b, the electronic diagrams of FIGS. 4a and 4b are identical except that the eight-bit register, the eight-bit counter and the eight-bit comparator of FIG. 4a are replaced by an eleven-bit register 415, an eleven-bit counter 416 and an eleven-bit comparator 417.

The signal to be analyzed is now a vertical synchronization signal VSYNCI. The analysis circuit 206 counts the number of pulses of the horizontal synchronization signal HSYNCI between two frame flyback pulses of the vertical synchronization signal VSYNCI and stores a value VAL2 representing this duration in the register 415. To count the number of lines in a frame, the counter 416 counts at the rate of the horizontal synchronization signal HSYNCI. The information gathered by these analysis circuits will enable the generation of horizontal and vertical synchronization signals more appropriate to the working of the phase-locked loop.

Indeed, according to another characteristic of the invention, the synchronization circuit 201 modifies the horizontal and vertical synchronization signals in such a way that the operation of the phase-locked loop is not disturbed by the start-of-frame and end-of-frame signal pulses present in the horizontal synchronization signal. To this end, an embodiment of the invention comprises a horizontal synchronization correction circuit 204 and a vertical synchronization correction circuit 207.

The time interval between two line synchronization pulses is stored as the value VAL1, as described above. In addition, the central part of the signal HSYNCI without any frame signal pulses enables the identification, on this portion of the signal HSYNCI, of the line synchronization pulses. Hence, at the end of a frame, it is possible to differentiate between the frame signal pulses and the line synchronization pulses. On the basis of this information, the correction circuit 204 produces a horizontal synchronization signal HSYNCO2 that does not have any end-of-frame signal pulses 104.

For the pulses of the start-of-frame synchronization signal, it is not possible to differentiate between the line synchronization pulses and the start-of-frame signal pulses. An embodiment of the invention, therefore, proposes the production of a vertical synchronization signal, VSYNCO2, whose frame flyback pulses are extended at the start of a frame until there are no longer any frame signal pulses 103. This is a function of the correction circuit 207.

Figure 5A:
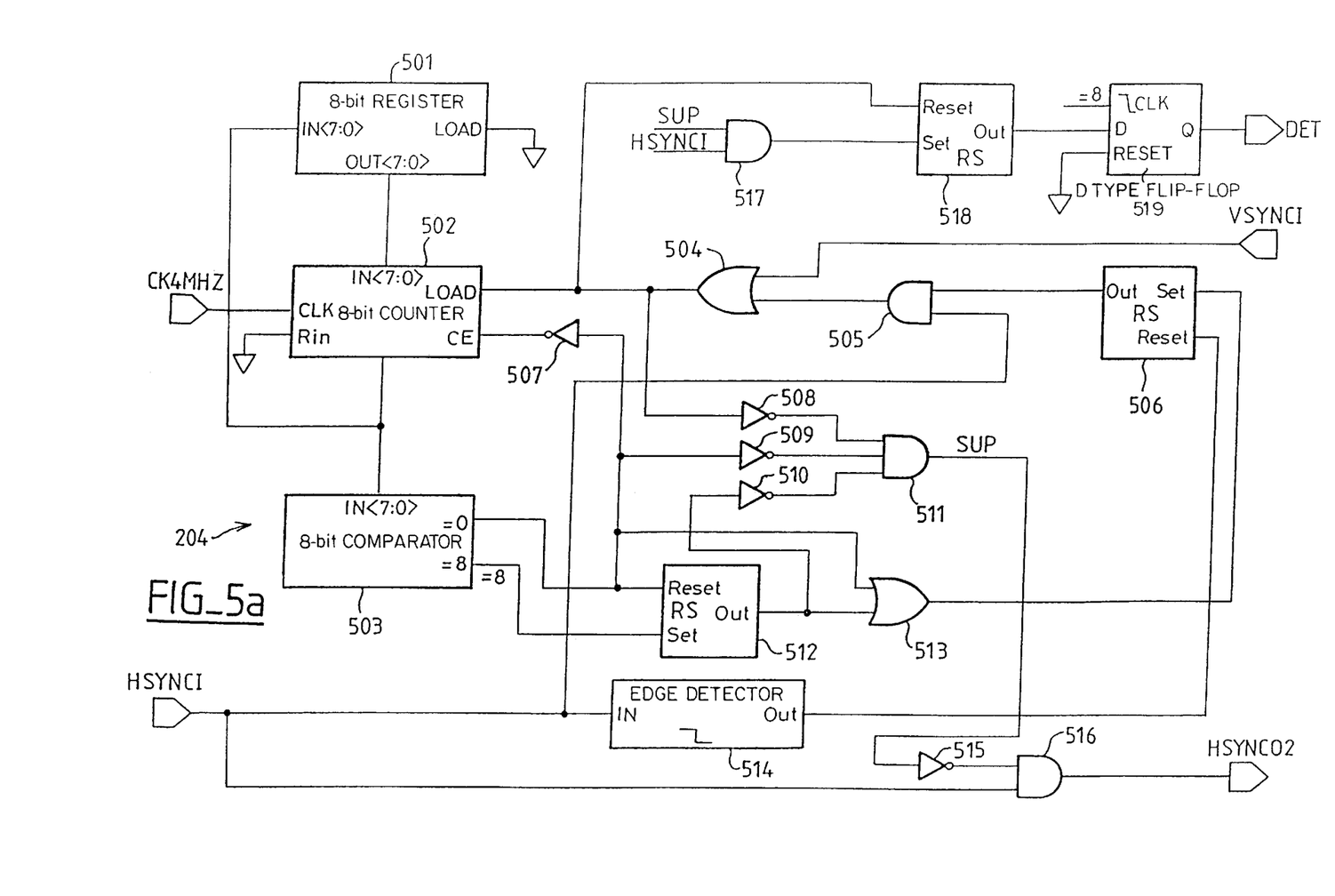
FIG. 5a shows one embodiment of the horizontal synchronization correction circuit according to the invention.

The structure of the correction circuit 204, illustrated in FIG. 5a, is as follows: the correction circuit 204 has an eight-bit register 501, an eight-bit counter 502 and an eight-bit counter 503 whose data inputs and data outputs are connected as in FIG. 4a. The input LOAD of the register 501 and the input Rin of the counter 502 are connected to ground. The input CLK of the counter receives a clock signal CK4MHZ, with a frequency of 4 MHz.

The horizontal synchronization signal to be corrected, HSYNCI, goes into a first input of an AND gate 505, a first input of an AND gate 516 and the input IN of a trailing edge detector 514. The comparator 503 has an output=0 connected to the input Reset of an RS flip-flop circuit 512, to a first input of an OR gate 513, to a first input of an AND gate 511 (by means of an inverter gate 509) and to the enable input CE of the counter 502 by means of an inverter gate 507.

The output=8 of the comparator 503 is connected to the input Set of the RS flip-flop circuit 512. The output Out of this flip-flop circuit is connected to a second input of the OR gate 513 and, by means of an inverter gate 510, to a second input of the AND gate 511. The output of the OR gate 513 is connected to the input Set of an RS flip-flop circuit 506. The input Reset of this flip-flop circuit is connected to the output Out of the trailing edge detector 514 and its output Out is connected to a second input of the AND gate 505 whose output is connected to a first input of an OR gate 504.

In this circuit, the vertical synchronization signal VSYNCI is used to turn off the counter 502 during the frame flyback pulse. The vertical synchronization signal VSYNCI goes into the second input of the OR gate 504 whose output is connected to the input LOAD of the counter 502 and by means of an inverter gate 508, to a third input of the AND gate 511. The output of the AND gate 511 delivers a pulse blanking signal SUP, connected to a second input of the AND gate 516 by means of an inverter gate 515. The pulse blanking signal enables the screening out of the frame signal pulses. The output of the AND gate 516 delivers the corrected horizontal synchronization signal HSYNCO2.

This circuit works as follows: prior to correction, the register 501 is pre-loaded with the value VAL1 representing the time interval between two line synchronization pulses obtained by the analysis circuit 203.

When the horizontal synchronization signal to be corrected, HSYNCI, presents a trailing edge of a line synchronization pulse, the counter 502 starts counting down from the starting value contained in the register 501. The counter 502 then counts down at the rate of the clock signal CK4MHZ. At the same time, the pulse blanking signal SUP becomes active and remains so until the counter 502 reaches the number 8. When the signal HSYNCI shows a fine signal pulse, the pulse blanking signal SUP being at 1, the output signal HSYNCO2 remains at 0. By contrast, as soon as the counter 502 reaches the value 0, the output signal HSYNCO2 is identical to the input signal HSYNCI.

There is thus obtained an output signal HSYNCO2 that has had the end-of-frame signal pulses removed. The correction circuit 204 acts during an entire period of the horizontal synchronization signal HSYNCI. However, it may not necessarily be used to accurately modify the signal HSYNCI at the start of a frame, because it cannot differentiate between the frame signal pulses and the line synchronization pulses. Instead, circuit 204 has a circuit 517–519 for the detection of start-of-frame signal pulses of the signal HSYNCI. This circuit will send the vertical synchronization correction circuit 207 a signal indicating the presence of start-of-frame signal pulses.

The detection circuit may have an AND gate 517 receiving the pulse blanking signal SUP at a first input and the horizontal synchronization signal HSYNCI at a second input. The output of this gate is connected to the input Set of an RS flip-flop circuit 518 whose input Reset is connected to the output of the OR gate 504 and whose output Out is connected to the input D of a D-type flip-flop circuit 519. The input Reset of this D-type flip-flop circuit is connected to the ground while the input CLK is connected to the output=8 of the comparator 503. Finally, the output Q of the D-type flip-flop 519 delivers a frame signal pulse detection signal DET. This signal DET is used by the vertical synchronization correction circuit 207.

This circuit 517–519 works as follows: the pulse blanking signal SUP is at 1 between two line synchronization pulses. Hence, when the signal HSYNCI shows a signalling pulse, the input Set of the RS flip-flop circuit 518 goes to 1 and the signal DET goes to 1 at the end of the period of the signal HSYNCI. When there is no signalling pulse, the signal DET remains at 0.

It can be seen that the signal DET is offset by one period with respect to the signal HSYNCI. This may be necessary in order to read an entire signal period before it can be known whether it contains a frame signal pulse.

The synchronization circuit 201 also has a vertical synchronization correction circuit 207 to cancel out the effect of the start-of-frame signal pulses on the operation of the phase-locked loop. A principle of operation of this circuit 207 is that of extending the frame flyback pulse during the start-of-frame signalling pulses. In the embodiment described in FIG. 5b, the frame flyback pulse is extended automatically by a fixed number of lines stored in a register. This number corresponds to the minimum number of lines taken up by the frame signals, for the particular standard. The storing, in the register, of the maximum number of lines taken up by the frame signal could be adopted. However, in this case, the phase-locked loop would have been inhibited for a maximum period of time. Accordingly, the frame flyback pulse may be extended for an additional duration if there are start-of-frame signal pulses that remain in the signal HSYNCI. In other words, so long as the frame signal pulse detection signal DET is at a high level, the frame flyback pulse is extended for a fixed duration and an additional duration if need be.

Figure 5B:
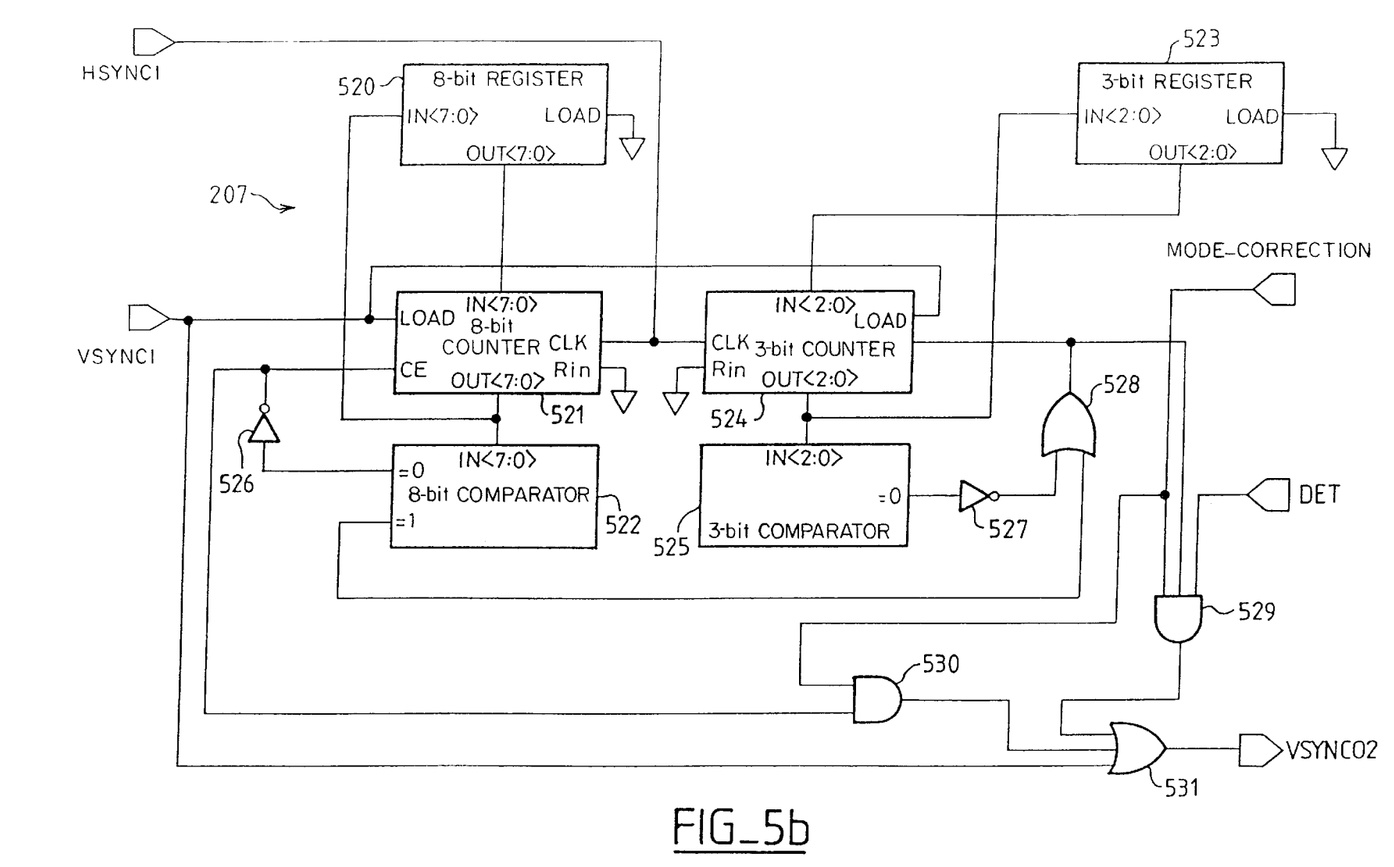
FIG. 5b shows one embodiment of the vertical synchronization correction circuit according to the invention.

To do this, the correction circuit 207 shown in FIG. 5b has an eight-bit register 520, an eight-bit counter 521 and an eight-bit comparator 522. The output OUT<7:0> of the register 520 is connected to the input IN<7:0> of the counter 521 and vice versa. Furthermore, the output OUT<7:0> of the counter 521 is connected to the input IN<7:0> of the comparator 522. The input LOAD of the register 520 and the input Rin of the counter 521 are connected to the ground.

FIG. 5b also has a three-bit register 523, a three-bit counter 524 and a three-bit comparator 525. In the same way, the output OUT<2:0> of the register 523 is connected to the input IN<2:0> of the counter 524 and vice versa. Similarly, the output OUT<2:0> of the counter 524 is connected to the input IN<2:0> of the comparator 525. The input LOAD of the register 523 and the input Rin of the counter 524 are connected to the ground.

The register 520 contains the minimum number of lines taken up by the frame signal for the particular standard. Furthermore, the register 523 contains the number 0.

The input LOAD, of each counter 521 and 524 receives the vertical synchronization signal VSYNCI, while the inputs CLK receive the horizontal synchronization signal HSYNCI. The output=0 of the comparator 522 is connected, by means of an inverter gate 526, to the enable input CE of the counter 521 and to a first input of an AND gate 530. Furthermore, the output=1 of the comparator 522 is connected to a first input of an OR gate 528 and the output=0 of the comparator 525 is connected through an inverter 517 to a second input of this same gate. The output of the OR gate 528 is connected to the enable input CE of the counter 524 and to a first input of an AND gate 529. At a second input, the AND gate 529 also receives the frame signal pulse detection signal DET delivered by the horizontal synchronization correction circuit 207 and, at a third input, it receives a correction signal MODE_CORRECTION. The signal MODE_CORRECTION triggers the working of the correction circuit 207. Furthermore, the MODE_CORRECTION signal goes into a second input of the AND gate 530. The output of the gates 529 and 530 are connected respectively to a first input and a second input of an OR gate 531. The OR gate 531 also receives the horizontal synchronization signal VSYNCI at a third input and delivers the corrected vertical synchronization signal VSYNCO2 at output.

Figure 6:
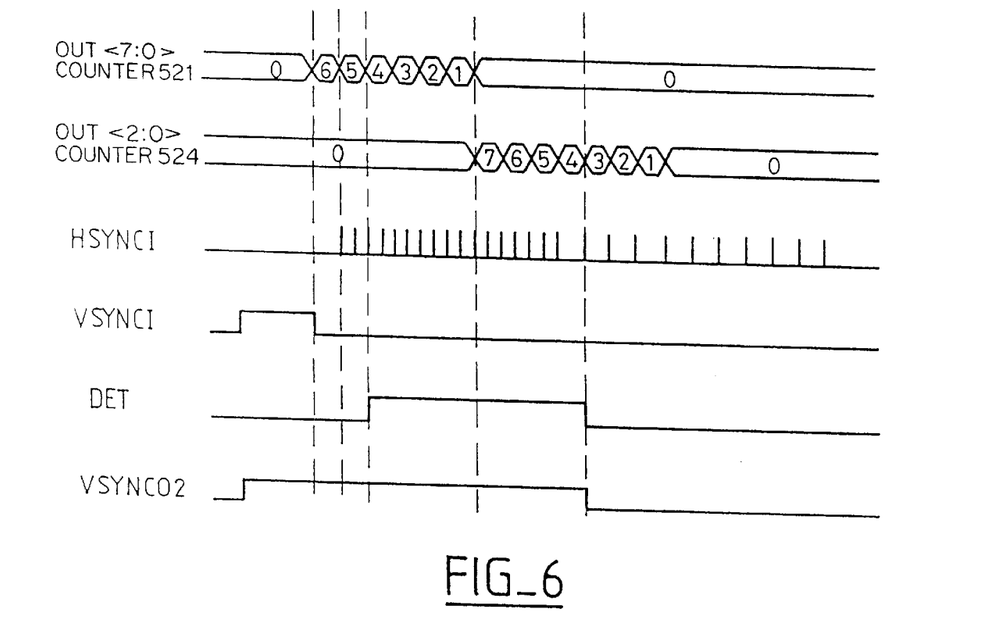
FIG. 6 shows a timing diagram of the main signals during operation of one embodiment of the vertical synchronization correction circuit.

The working of this correction circuit shall be understood more clearly from the timing diagrams given in FIG. 6. The register 520 is pre-loaded with the minimum number of lines used for frame signals in the different standards that represent the fixed part of the extension of the frame flyback pulse. In this example, this value is equal to 6. The register 523 contains the value 0.

The working of the circuit 207 may be as follows: at the end of the frame flyback pulse of the signal VSYNCI, the counter 521 starts counting down from the initial value contained in the register 520. During the countdown by the counter 521, the output signal VSYNCO2 is kept at 1. In the example of FIG. 6, the frame flyback pulse is automatically extended by six lines. Then, the counter 524 starts counting down when the output OUT<7:0> of the counter 521 is equal to 1. The counter 524 goes to 7 when the counter 521 goes to 0. So long as the state of the counter 521 is not equal to 0 and so long as the signal DET is at 1, the output signal VSYNCO2 is kept at 1. Starting from the instant when there is no longer any frame signal pulse, the vertical synchronization output signal VSYNCO2 goes back to 0 with a one-line shift due to the signal DET. By this circuit 207, the frame flyback pulse is therefore extended during the start-of-frame signal pulses 103.

For clarity, the drawings shown in FIGS. 3b and 4b have been made with elements using eleven-bit data elements. In practice, they can be made out of elements working with eight-bit data elements in series with elements working with three-bit data elements. This could be done in order to optimize the final scheme of the synchronization circuit 201 in using the same elements for the circuits 205, 206 and 207.

Hence, according to an advantageous embodiment of the synchronization circuit 201, the same elements are used for the three circuits 202, 203 and 204 processing the horizontal synchronization. This is also true for the circuits 205, 206 and 207. A microprocessor, not shown in the figures, then makes it possible to organize the connections among these different elements during use of the synchronization circuit.

Having thus described at least one illustrative embodiment of the invention, various modifications and improvements will readily occur to those skilled in the art and are intended to be within the scope of the invention. Accordingly, the foregoing description is by way of example only and is not intended as limiting. The invention is limited only as defined in the following claims and the equivalents thereto.

What is claimed is:

1. A synchronization circuit for screens with scanning circuits, the synchronization circuit receiving a clock signal and a horizontal synchronization input signal having line synchronization pulses, start-of-frame signal pulses and end-of-frame signal pulses, the synchronization circuit comprising:

a horizontal synchronization generation circuit, having a first input to receive the clock signal and an output, to produce on its output a first horizontal synchronization output signal including line synchronization pulses;

a horizontal synchronization analysis circuit, having a first input to receive the horizontal synchronization input signal, a second input to receive the clock signal and an output, to produce on its output an output signal having a first value representing a time interval between two of the line synchronization pulses of the horizontal synchronization input signal; and a horizontal synchronization correction circuit, having a first input to receive the horizontal synchronization input signal, a second input to receive the clock signal, a third input coupled to the output of the horizontal synchronization analysis circuit, a first output and a second output, to produce on its first output a second horizontal synchronization output signal and on its second output a signal pulse detection output signal;

wherein the horizontal synchronization circuit comprises a circuit to produce the second horizontal synchronization output signal without end-of-frame signal pulses.

2. A synchronization circuit for screens with scanning circuits, the synchronization circuit receiving a clock signal and a horizontal synchronization input signal having line synchronization pulses, start-of-frame signal pulses and end-of-frame signal pulses, the synchronization circuit comprising:

a horizontal synchronization generation circuit, having a first input to receive the clock signal and an output, to produce on its output a first horizontal synchronization output signal including line synchronization pulses;

a horizontal synchronization analysis circuit, having a first input to receive the horizontal synchronization input signal, a second input to receive the clock signal and an output, to produce on its output an output signal having a first value representing a time interval between two of the line synchronization pulses of the horizontal synchronization input signal; and a horizontal synchronization correction circuit, having a first input to receive the horizontal synchronization input signal, a second input to receive the clock signal, a third input coupled to the output of the horizontal synchronization analysis circuit, a first output and a second output, to produce on its first output a second horizontal synchronization output signal and on its second output a signal pulse detection output signal;

wherein the horizontal synchronization correction circuit comprises a circuit to detect the start-of-frame signal pulses and the end-of-frame signal pulses in the horizontal synchronization input signal, and to produce the signal pulse detection signal.

3. A synchronization circuit for screens with scanning circuits, the synchronization circuit receiving a clock signal and a horizontal synchronization input signal having line synchronization pulses, start-of-frame signal pulses and end-of-frame signal pulses, the synchronization circuit comprising:

a horizontal synchronization generation circuit, having a first input to receive the clock signal and an output, to produce on its output a first horizontal synchronization output signal including line synchronization pulses;

a horizontal synchronization analysis circuit, having a first input to receive the horizontal synchronization input signal, a second input to receive the clock signal and an output, to produce on its output an output signal having a first value representing a time interval between two of the line synchronization pulses of the horizontal synchronization input signal; and a horizontal synchronization correction circuit, having a first input to receive the horizontal synchronization input signal, a second input to receive the clock signal, a third input coupled to the output of the horizontal synchronization analysis circuit, a first output and a second output, to produce on its first output a second horizontal synchronization output signal and on its second output a signal pulse detection output signal;

wherein the horizontal synchronization correction circuit comprises a timing circuit to measure the time interval between the two of the line synchronization pulses of the horizontal input signal, a second register to store the first value, and a third register to store the first value.

4. A synchronization circuit for screens with scanning circuits, the synchronization circuit receiving a clock signal and a horizontal synchronization input signal having line synchronization pulses, start-of-frame signal pulses and end-of-frame signal pulses, the synchronization circuit comprising:

a horizontal synchronization generation circuit, having a first input to receive the clock signal and an output, to produce on its output a first horizontal synchronization output signal including line synchronization pulses;

a horizontal synchronization analysis circuit, having a first input to receive the horizontal synchronization input signal, a second input to receive the clock signal and an output, to produce on its output an output signal having a first value representing a time interval between two of the line synchronization pulses of the horizontal synchronization input signal;

a horizontal synchronization correction circuit, having a first input to receive the horizontal synchronization input signal, a second input to receive the clock signal, a third input coupled to the output of the horizontal synchronization analysis circuit, a first output and a second output, to produce on its first output a second horizontal synchronization output signal and on its second output a signal pulse detection output signal;

an input terminal to receive a vertical synchronization input signal which includes frame flyback pulses;

a vertical synchronization generation circuit, having an input coupled to the output of the horizontal synchronization generation circuit, to produce a first vertical synchronization output signal;

a vertical synchronization analysis circuit, having a first input coupled to the input terminal and a second input to receive the horizontal synchronization input signal, to determine a second value representing a number of lines between two frame flyback pulses of the vertical synchronization input signal; and a vertical synchronization correction circuit, having a first input to receive the horizontal synchronization signal, a second input coupled to the input terminal and a third input coupled to the second output of the horizontal synchronization correction circuit, to provide a second vertical synchronization output signal.

5. The synchronization circuit of claim 4, wherein the vertical synchronization generation circuit comprises a first register to store a third value representing a number of the line synchronization pulses of the first horizontal synchronization output signal during a period of the first vertical synchronization output signal.

6. The synchronization circuit of claim 5, wherein the vertical synchronization analysis circuit comprises a circuit to measure the second value and a second register to store the second value.

7. The synchronization circuit of claim 6, wherein the vertical synchronization correction circuit comprises a circuit to produce the second vertical synchronization output signal such that the second vertical synchronization output signal includes frame flyback pulses that correspond to the frame flyback pulses in the vertical synchronization input signal, and wherein the frame flyback pulses of the second vertical synchronization signal are extended when at least one of the start-of-frame signal pulses is present on the horizontal synchronization input signal.

8. The synchronization circuit of claim 4, in combination with a television screen.

9. A method of operating a phase locked loop in a scanning circuit for a screen, the phase locked loop having an input for tracking a first synchronization signal having synchronization pulses and frame signal pulses providing synchronization for information to be displayed on the screen, the method comprising steps of:

(A) providing the first synchronization signal to the phase locked loop; and (B) limiting interference with the operation of the phase locked loop caused by the changes of frequency in the first synchronization signal due to the frame signal pulses, thereby maintaining operation of the phase locked loop within a normal range of operation for the phase locked loop, the step (B) including steps of:

measuring a time interval between two of the line synchronization pulses and before providing the first synchronization signal to the phase locked loop in the step (A), removing one of the frame signal pulses of the first synchronization signal that occur during a time period after one of the line synchronization pulses occurs on the first synchronization signal, the time period being equal in length to the measured time interval.

10. The method of claim 9, further comprising the step of:
generating a second synchronization signal that has line synchronization pulses and is free of frame signal pulses.

11. A method of operating a phase locked loop in a scanning circuit for a screen, the phase locked loop having an input for tracking a first synchronization signal having synchronization pulses and frame signal pulses providing synchronization for information to be displayed on the screen, the method comprising steps of:

(A) providing the first synchronization signal to the phase locked loop; and (B) limiting interference with the operation of the phase locked loop caused by the changes of frequency in the first synchronization signal due to the frame signal pulses by inhibiting operation of the phase locked loop during a period when at least one of the frame signal pulses is present on the first synchronization signal by extending a frame-flyback pulse on a second synchronization signal and thereby maintaining operation of the phase locked loop within a normal range of operation for the phase locked loop.

12. The method of claim 11, wherein the step (B) comprises steps of:

detecting when one of the frame signal pulses is present on the first synchronization signal;

providing a detection signal to indicate when the one of the frame signal pulses is detected on the first synchronization signal.

13. The method of claim 11, wherein the step (B) comprises steps of:

detecting when frame signal pulses are present on the first synchronization signal;

extending the frame-flyback pulse to cover a time period when at least one of the frame signal pulses is detected on the first synchronization signal; and inhibiting operation of the phased locked loop during the extended frame flyback pulse.

14. The method of claim 13, further comprising the steps of:

generating a third synchronization signal that has line synchronization pulses and is free of frame signal pulses; and generating a fourth synchronization signal, based on the third synchronization signal, the fourth synchronization signal having frame flyback pulses.

15. The method of claim 11, wherein the step (B) further comprises a step of removing at least one of the frame signal pulses from the first synchronization signal before providing the first synchronization signal to the phase locked loop in the step (A).

16. The method of claim 15, wherein the screen is a television screen and the step (A) comprises a step of providing to the phase locked loop the first synchronization signal including synchronization pulses that provide synchronization information for the television screen.

17. A method of processing synchronization signals used with a screen having a scanning circuit that uses at least one synchronization signal to synchronize information displayed on the screen, the method comprising the steps of:

(A) measuring, on a first synchronization signal that provides synchronization for the information to be displayed on the screen and having a plurality of line synchronization pulses, a time interval between two of the line synchronization pulses; and (B) providing the first synchronization signal to the scanning circuit so that the scanning circuit can use the first synchronization signal to synchronize the information to be displayed on the screen;

wherein the first synchronization signal has frame flyback pulses, and the step (b) comprises a step of measuring a number of line synchronization pulses that occur on a second synchronization signal during a time period between a first frame flyback pulse and second frame flyback pulse on the first synchronization signal.

18. The method of claim 17, wherein the screen is a television screen, and wherein the step (B) comprises a step of providing to the scanning circuit the first synchronization signal including line synchronization pulses that provide synchronization information for the television screen.

19. A synchronization circuit for use with a screen having a scanning circuit that includes a phase locked loop having an input to receive a first synchronization signal having synchronization pulses and frame signal pulses used by the scanning circuit to synchronize information to be displayed on the screen, the first synchronization signal having a frequency that varies when the frame signal pulses occur, the synchronization circuit comprising:

a first input terminal to receive the first synchronization signal; and means, coupled to the first input terminal, for limiting interference with the operation of the phase locked loop caused by changes in the frequency of the first synchronization signal when the frame signal pulses occur, the means for limiting comprising:

means, coupled to the first input terminal, for measuring a first time interval between two of the synchronization pulses; and means, coupled to the first input terminal and to the means for measuring, for suppressing any pulse that occurs on the first synchronization signal during the first time interval after one of the line synchronization pulse occurs.

20. A synchronization circuit for use with a screen having a scanning circuit that includes a phase locked loop having an input to receive a first synchronization signal having synchronization pulses and frame signal pulses used by the scanning circuit to synchronize information to be displayed on the screen, the first synchronization signal having a frequency that varies when the frame signal pulses occur, the synchronization circuit comprising:

a first input terminal to receive the first synchronization signal; and means, coupled to the first input terminal, for limiting interference with the operation of the phase locked loop caused by changes in the frequency of the first synchronization signal when the frame signal pulses occur;

wherein the means for limiting comprises means for inhibiting operation of the phase locked loop when at least one of the frame signal pulses is present on the first synchronization signal, the means for inhibiting comprising means for extending a frame-flyback pulse on a second synchronization signal to cover a time period when one of the frame signal pulses is present on the first synchronization signal.

21. The synchronization circuit of claim 20, in combination with the screen, wherein the screen is a television screen.

22. The synchronization circuit of claim 20, wherein the means for inhibiting comprises:

means, coupled to the first input terminal, for detecting when one of the frame signal pulses is present on the first synchronization signal.

23. The synchronization circuit of claim 20, further comprising:

a second input terminal to receive the second synchronization signal having frame flyback pulses; and wherein the means for inhibiting further comprises:
means, coupled to the first input terminal, for detecting when one of the frame signal pulses is present on the first synchronization signal and
means, coupled to the means for extending, for inhibiting operation of the phased locked loop when a frame flyback pulse is present on the second synchronization signal.

24. The synchronization circuit of claim 23, further comprising:
means for generating a third synchronization signal that has line synchronization pulses and is free of frame signal pulses; and
means for generating a fourth synchronization signal, coupled to the output of the means for generating a third synchronization signal, the fourth synchronization signal having frame signal pulses.

25. The synchronization circuit of claim 20, wherein the means for limiting further comprises means for removing at least one of the frame signal pulses from the first synchronization signal.

26. The synchronization circuit of claim 25, in combination with the screen, wherein the screen is a television screen.

27. A method of operating, in a first mode and a second mode, a synchronization circuit in a scanning circuit for a screen, the synchronization circuit including an edge detector, a counter, and a first input terminal to receive a first synchronization signal used by the scanning circuit to synchronize information to be displayed on the screen, the method comprising the steps of:

(A) receiving the first synchronization signal at the first input terminal;

(B) arranging a first plurality of connections among the edge detector, the first input terminal and the counter to measure a characteristic of the first synchronization signal during the first mode of operation; and (C) rearranging the first plurality of connections among the edge detector, the first input terminal and the counter to produce a modified first synchronization signal during the second mode of operation.

28. The method of claim 27, wherein the step (C) comprises a step (D) of producing the modified first synchronization signal to have fewer variations in frequency than the first synchronization signal.

29. The method of claim 28, wherein the first synchronization signal includes a first type of frame signal pulse and a second type of frame signal pulse; and wherein
the step (D) comprises a step (E) of arranging the first plurality of connections to produce the modified first synchronization signal by removing substantially all of the second type of frame signal pulses from the first synchronization signal.

30. The method of claim 27, wherein the circuit includes a second input terminal, wherein the first synchronization signal includes frame playback pulses, wherein the method further comprises a step of
receiving on the second input terminal a second synchronization signal having a first type of frame signal pulse and a second type of frame signal pulse; and wherein the step (C) comprises a step of arranging the first plurality of connections to produce the modified first synchronization signal to include a plurality of frame playback pulses that correspond to the frame flyback pulses of the first synchronization signal extended such that one of the frame playback pulses of the modified first synchronization signal covers a period where the first type of frame signal pulse is present on the second synchronization signal.

31. The method of claim 30, wherein the step (C) comprises a step of using a microprocessor to arrange the first plurality of connections.

32. The method of claim 31, further comprising a step of rearranging the first plurality of connections to generate a first generated synchronization signal.

33. The method of claim 27, wherein the circuit includes a second input terminal, a second edge detector and a second counter, and wherein the method further comprises steps of:

receiving a second synchronization signal on the second input terminal;

arranging a second plurality of connections among the second input terminal, the second counter, the second edge detector and the clock signal to measure a characteristic of the second synchronization signal; and (F) arranging the second plurality of connections among the second input terminal, the second counter, the second edge detector and the clock signal to produce a modified second synchronization signal.

34. The method of claim 33, wherein the first synchronization signal includes a first type of frame signal pulse and a second type of frame signal pulse; and wherein:

the step (C) comprises a step of arranging the first plurality connections to produce the modified first synchronization signal by removing substantially all of the second type of frame signal pulses from the first synchronization signal; and the step (F) comprises a step of arranging the second plurality of connections to produce the modified second synchronization signal to include a plurality of frame playback pulses corresponding to the frame flyback pulses of the first synchronization signal extended such that one of the frame playback pulses of the modified second synchronization signal covers a period where the first type of frame signal pulse is present on the first synchronization signal.

35. The method of claim 34, wherein the screen is a television screen and wherein the step (C) includes a step of arranging the first plurality of connections to provide the modified first synchronization signal to synchronize information to be displayed on the television screen.

36. The method of claim 34, further comprising steps of:
rearranging the first plurality of connections to generate a first generated synchronization signal; and
rearranging the second plurality of connections to generate a second generated synchronization signal.

* * * * *

UNITED STATES PATENT AND TRADEMARK OFFICE
CERTIFICATE OF CORRECTION

PATENT NO. : 6,052,153
DATED : April 18, 2000
INVENTOR(S) : Sebastien Marsanne, Philippe Berger and Vincent Chanel It is certified that error appears in the above-identified patent and that said Letters Patent is hereby corrected as shown below:

Title page,
Item [73] should read as follows:

[73] Assignee: SGS-Thomson Microelectronics S.A., Gentilly, France

Signed and Sealed this

Eighteenth Day of September, 2001

*Attest:*

NICHOLAS P. GODICI
*Attesting Officer*     *Acting Director of the United States Patent and Trademark Office*